July 15, 1969 G. DIEMER 3,456,209
PN JUNCTION INJECTION LASER USING A REFRACTIVE INDEX
GRADIENT TO CONFINE THE LASER BEAM
Filed Feb. 18, 1964 2 Sheets-Sheet 1

INVENTOR.
GESINUS DIEMER
BY
AGENT

July 15, 1969     G. DIEMER     3,456,209
PN JUNCTION INJECTION LASER USING A REFRACTIVE INDEX
GRADIENT TO CONFINE THE LASER BEAM
Filed Feb. 18, 1964     2 Sheets-Sheet 2

INVENTOR.
GESINUS DIEMER
BY
AGENT 3,456,209
PN JUNCTION INJECTION LASER USING A REFRACTIVE INDEX GRADIENT TO CONFINE THE LASER BEAM
Gesinus Diemer, Emmasingel, Eindhoven, Netherlands, assignor, by mesne assignments, to U.S. Philips Corporation, New York, N.Y., a corporation of Delaware
Filed Feb. 18, 1964, Ser. No. 345,791
Claims priority, application Netherlands, Mar. 22, 1963, 290,588
Int. Cl. H01s *3/00;* G02f *1/26, 1/28*
U.S. Cl. 331—94.5
12 Claims

ABSTRACT OF THE DISCLOSURE

An injection maser of the p-n junction, semiconductive type wherein the semiconductive body is doped or its composition modified to provide a decreasing refractive index gradient on opposite sides of the junction to confine the laser mode to a narrower region of the body and reduce diffraction losses.

---

The invention relates to an injection maser containing a semi-conductor body having a p-type region, a n-type region and a p-n junction layer, in which at least one of these regions contains so high a concentration of the impurities which determine the conductivity type that at the location of the junction layer stimulated emission of recombination radiation and hence a beam of radiation extending substantially parallel to the junction can be produced by injection of free charge carriers. The recombination radiation consists, for example, of visible light or infrared radiation.

The term "p-n junction layer" is used herein in the usual manner to means a p-n junction, or, if a substantially intrinsic layer is present, a p-i-n junction.

Known injection masers have a p-n junction which forms the common boundary of the p-type and n-type regions, while from the p-type region free charge carriers in the form of holes may be injected in an adjoining part of the n-type region and/or from the n-type region free charge carriers in the form of electrons may be injected into an adjoining part of a p-type region. A layer which belongs to the said adjoining parts and includes the p-n junction forms the active layer for stimulated emission of recombination radiation.

To make possible an injection of free charge carriers which is sufficient to produce stimulated emission, the p-type region and/or the n-type region must be highly doped, that is to say, that in the p-type region at least more than half of the number of available levels per unit of volume in the valence band is occupied by free charge carriers and/or that in the n-type region at least more than half of the number of available levels per unit of volume in the conduction band is occupied by free charge carriers.

The term "emission of recombination radiation" is used in the usual manner to mean emission of radiation produced by recombination of an electron in the conduction band with a hole in the valence band, if required through an intermediate energy level in the forbidden band between the valence band and the conduction band.

If this emission takes place without any influence of radiation already present, this is referred to as spontaneous emission of recombination radiation.

If this emission takes place under the influence of radiation (stimulating radiation) having the same frequency as the recombination radiation, this is referred to as stimulated emission of recombination radiation. The recombination radiation (stimulated radiation) in this case is added to the stimulating radiation and is in phase and correlated with the stimulating radiation. The stimulated emission may be started by stimulating radiation produced by spontaneous emission of recombination radiation or by externally supplied stimulating radiation.

An injection maser generally comprises two optically reflecting members between which stimulating radiating is adapted to oscillate through the active layer, enabling stimulated recombination radiation to be continuously added to the stimulating radiation. The decrease in free charge carriers present in the active layer, which decrease is due to recombination, must be compensated for by the afore-mentioned injection of free charge carriers.

At least one of the reflecting members is partially transmitting, so that radiation can continuously be emitted. This emitted radiation is coherent and hence the injection maser is a source of coherent radiation, for example, coherent visible light or coherent infra-red radiation.

The reflecting members may be two opposite parallel surfaces of the semi-conductor body which may be provided with a reflecting layer and extend at right angles to the active layer.

The stimulating radiation must pass through the active layer substantially at right angles to the direction of thickness of this layer in order to produce optimum conditions for the stimulated emission.

The invention is based on the following considerations.

The active layer necessarily is a thin layer, that is to say, this layer is not very thick with respect to the wavelength of the stimulated recombination radiation and its thickness is, for example, only a few times this wavelength, for to produce stimulated emission of recombination radiation it is necessary that the free charge carriers injected into the active layer should rapidly recombine, and this means that the diffusion-recombination length $1_{dr}$ of the free-charge carriers in the active layer is small. Since the thickness of the active layer is of the same order as $1_{dr}$, this means that this thickness also is small.

As is usual, the term "diffusion-recombination length $1_{dr}$" is used to means a quantity defined by:

$$1_{dr} = \sqrt{D\tau}$$

where D is the diffusion constant of the free charge carriers in the active layer and $\tau$ is the life time of these charge carriers.

Owing to the small thickness of the active layer, radiation travelling substantially at right angles to the direction of thickness of this layer and in this layer tends to escape therefrom by diffraction, and this results in radiation losses, which are materiallly increased by absorption by free charge carriers.

In addition, in the operation of the known injection masers, the injection of free charge carriers at which the stimulated emission is just started, produces a variation in the concentration of free charge carriers in the direction of thickness of the active layer and hence, likewise in this direction of thickness, a gradient in the phase velocity of the radiation which travels substantially at right angles to the direction of thickness of this active layer, and this gradient has a sign such that additional radiation losses occur due to refraction phenomena.

The radiation losses adversely affect, i.e., increase, the threshold value of the pumping energy, that is to say, the value of the pumping energy at which the stimulated emission of recombination radiation is just started.

The term "pumping energy" is used herein in the usual manner to mean the energy which is supplied to the semiconductor body to produce injection of free charge carriers into the active layer. The pumping energy is supplied by passing an electric current through the semi-conductor body at right angles to the active layer.

It is an object of the invention to reduce the said radiation losses.

According to the invention, an injection maser comprising a semi-conductor body having a p-type region, an n-type region and a p-n junction layer, with at least one of these regions containing so high a concentration of impurities which determine the conductivity type that stimulated emission of recombination radiation and hence a beam of radiation substantially parallel to the junction layer may be produced at the location of the junction layer by injection of free charge carriers, is characterized in that in the semi-conductor body on both sides of the junction layer, viewed in a direction substantially at right angles to and away from the junction layer and measured between two points of the semi-conductor on the same side of the center of which one is spaced from the centre of the junction layer by a distance at least equal to $\frac{1}{2}\lambda_m$ and the other by a larger distance at most equal to 30 $\lambda_m$, a decrease of the real part of the index of refraction of at least $$\frac{10\lambda_m^2}{a^2}$$

percent is produced, where $a$ is the distance to the junction on the relevant side of the junction layer, reckoned from the centre of the junction layer, through which the said decrease of the real part of the index of refraction is produced, and $\lambda_m$ is the wavelength of the recombination in the semi-conductor material. Preferably, the distance $a$ is equal to at most 15 $\lambda_m$.

The term "the centre of the junction" is used herein to mean the plane of the associated p-n junction or, in the case of a p-i-n junction, the centre of the substantially intrinsic layer.

It has been found that the radiation losses are considerably reduced by the said decrease of the real part of the index of refraction, which helps to confine the laser mode to a narrower active region. Furthermore, a slight curvature of the junction, which it is frequently difficult to avoid during the manufacture of the injection maser, proves to be less troublesome owing to the steps according to the invention.

An alteration of the index of refraction may be achieved in a semi-conductor body by changing the concentration of the impurities determining the conductivity type, and hence an important embodiment of an injection maser according to the invention is characterized in that on at least one side of the junction layer, in a direction away from the junction layer, there is produced an increase in the concentration of the impurities determining the conductivity type which at least partly causes the said decrease of the real part of the index of refraction.

It has been found that radiation losses are materially reduced by an increase in the concentration of the impurities determining the conductivity type, at which for the associated increase in the concentration of free charge carriers the condition applies:

$$\frac{N_2}{m_2^*}-\frac{N_1}{m_1^*}\geq\frac{1.4\times 10^{20}}{a^2}$$

where $N_1$ and $m_1^*$ are the concentration of free charge carriers (the number of free charge carriers per cubic centimeter) and the effective mass of the free charge carriers (expressed in units equal to the mass of a free electron in a vacuum) respectively at a distance of $\frac{1}{2}\lambda_m$ from the centre of the junction layer, while $N_2$ and $m_2^*$ represent these quantities approximately at the distance $a$ from the centre of the junction layer, the decrease in the real part of the index of refraction being produced on the relevant side of the junction layer through the distance $a$.

In general, the concentration N of free charge carriers is substantially equal to the effective concentration of the impurities determining the conductivity type, that is to say, substantially equal to the concentration of all the impurities determining the conductivity type which are present less the concentration of the impurities of the opposite conductivity type which are present. If, for example, per impurity more than one free charge carrier is produced, there occurs a related difference between the concentration of the impurities determining the conductivity type and the concentration of free charge carriers.

In the semi-conductor theory the quantity $N/n^*$ is defined by the formula:

$$\frac{N}{m^*}=\frac{4\pi^2\epsilon_0\nu_p^2 n_o^2}{e^2}$$

where:

N is the concentration of free charge carriers, $e$ is the mass of a free electron in a vacuum, $\epsilon_o$ is the dielectric constant in a vacuum, $\nu_p$ is the plasma frequency in the semi-conductor material containing a concentration N of free charge carriers, and $n_o$ is the limiting value of the index of refraction of the semi-conductor material for high frequencies, all the quantities being expressed in the metre-kilogram-second system and thus $m^*$ is in kg.

The plasma frequency $\nu_p$ can be determined in known manner from reflection measurements. When the reflection of radiation incident upon a semi-conductor body is measured as a function of the frequency of the incident radiation, at a certain frequency $\nu_m$ there is a minimum reflection, $\nu_p$ being related to $\nu_m$ according to the formula $$\nu_p=\left(1-\frac{1}{n_o^2}\right)\nu_m$$

The concentration of free charge carriers $N_2$ approximately at the distance $a$ from the centre of the junction layer preferably is not excessive, since with a very high concentration $N_2$ the absorption by free charge carriers may become troublesome. Hence the concentration $N_2$ of free charge carriers approximately at the distance $a$ from the centre of the junction layer preferably is less than $1.2\times 10^{21}\ m_2^*/\lambda_m^2$.

In an important embodiment of an injection maser according to the invention the semi-conductor body on both sides of the junction layer in a direction away from the junction layer shows an increase in the concentration of the impurities determining the conductivity type, which increase substantially entirely entails the decrease in the real part of the index of refraction on both sides of the junction layer.

Although in many cases a sufficient decrease of the index of refraction is obtainable by an increase in the concentration of the impurities determining the conductivity type, in certain cases a sufficient increase in the concentration of impurities provides difficulty, for example, because impurities which for other reasons are desirable have insufficient solubility in the semi-conductor material or, in the case of large concentrations, produce an excessive inconvenient change in the width of the forbidden band between the valence band and the conduction band, (this latter phenomenon, however, may frequently be advantageous) and furthermore cause an undesirable shift of the optical absorption edge in the semi-conductor material. To meet these cases, a further important embodimen of an injection maser according to the invention is characterized in that in the semi-conductor body, apart from the impurities determining the conductivity type, on at least one side of the junction layer, a change in the composition of the semi-conductor material itself occurs which at least partly produces the decrease of the real part of the index of refraction.

In this embodiment, the decrease in the real part of the index of refraction on both sides of the junction layer preferably is caused substantially entirely by a change in the composition of the semi-conductor material itself.

In an advantageous embodiment the semi-conductor material at the location of the junction consists of gallium arsenide which on at least one side of the junction passes into gallium phosphide, at least into a mixed crystal of gallium phosphide and gallium arsenide, or at the location of the junction consists of indium antimonide which on at least one side of the junction passes into indium arsenide, at least into a mixed crystal of indium arsenide and induim antimonide. For example, the addition of 1 or 2% of phosphorous will produce a sufficiently large change of the index of refraction to confine the laser beam within a few microns only.

The junction layer preferably includes a substantially intrinsic layer, since on injection of free charge carriers a substantially intrinsic layer has properties more suitable for the production of recombination radiation than an extrinsic layer, in which the impurities may exert a troublesome influence. The thickness of the intrinsic layer preferably is at most equal to $10\lambda_m$.

It should be noted that the decrease of the real part of the index of refraction may also be due to simultaneously produced changes in the composition of the semi-conductor material itself and in the concentration of the impurities determining the conductivity type.

In order that the invention may readily be carried into effect, embodiments thereof will now be described, by way of example, with reference to the accompanying diagrammatic drawings, in which:

FIGURE 8 shows schematically an apparatus for deposition from the vapour phase for use in manufacturing an embodiment of an injection maser according to the invention, while

Figure 12:
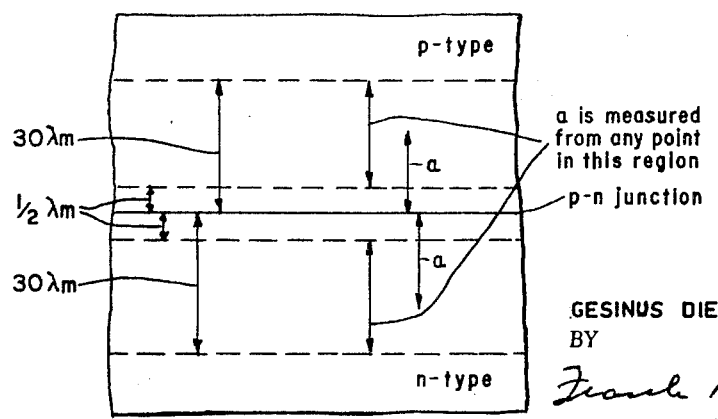
FIGURE 12 is a schematic diagram.

First, an embodiment of an injection maser according to the invention will be described, in the semi-conductor body of which on both sides of the p-n junction through a distance $a$ the decrease of the real part of the index or refraction is produced by an increase in the concentration of impurities determining the conductivity type, the method of manufacturing such a maser being also described. In FIG. 12 is illustrated the junction-containing body with the aforementioned distance relationships labelled for ease of understanding.

In this embodiment the semi-conductor body consists of gallium arsenide. In a body of gallium arsenide, for the wavelength $\lambda_m$ of the recombination radiation produced by stimulated emission in this body one obtains the approximate value $$\lambda_m = 0.2\mu$$

This means that for the maximum value of the distance $a$ we find:

$$a_{max} = 30\lambda_m = 6\mu \qquad (1)$$

or preferably $$a_{max} = 15\lambda_m = 3\mu \qquad (1')$$

while the decrease of the real part of the index of refraction must be reckoned from a point spaced by a distance of at least $\frac{1}{2}\lambda_m = 0.1\mu$ from the p-n junction.

Furthermore in respect of the decrease of the real part of the index of refraction $\Delta[Re(n)]$ the condition that $$\Delta[Re(n)] \geq 10\lambda_m^2/a^2 \qquad (2)$$

must be satisfied, while further conditions are:

$$\frac{N_2}{m_2^*} - \frac{N_1}{m_1^*} \geq 1.4 \times 10^{20}/a^2 \qquad (3)$$

and preferably $$N_2 < 1.2 \times 10^{21} m_2^*/\lambda_m^2 \qquad (4)$$

Figure 1:
FIGURES 1 to 7 are schematic cross-sectional views of a semi-conductor body in different stages during the manufacture of an embodiment of an injection maser according to the invention, the sectional view of FIGURE 5 being at right angles to that of FIGURE 4 and the sectional view of FIGURE 7 being at right angles to that of FIGURE 6.

Manufacture starts from an n-type gallium arsenide wafer 1 (FIGURE 1) of 1×1 mm. having a thickness of $50\mu$ and a donor concentration of $2 \times 10^{18}$ donors in the form of tellurium atoms per cubic centimetre.

Figure 2:

The wafer 1 is heated for about 2 minutes to 900° C. in a protective nitrogen atmosphere containing vapour or an alloy of gallium including 5 atom percent of zinc. The zinc diffuses into the wafer and forms a p-type surface layer 2 (FIGURE 2) having a thickness of about $10\mu$ and a surface concentration of about $2 \times 10^{19}$ zinc atoms per cubic centimetre. The gallium does not diffuse and serves only to control the concentration of the zinc atoms in the vapour of the alloy. During the diffusion process the alloy is also maintained at a temperature of about 900° C.

Figure 3:
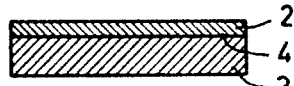

The p-type surface layer is removed in a manner usual in the semi-conductor art, for example, by etching and/or grinding the wafer with the exception of one large surface, resulting in the configuration of FIGURE 3 having an n-type region 3, a p-type region 2 and a p-n junction 4.

It is found that in the n-type region 3, starting from the p-n junction 4 through a distance of about $2\mu$, the effective concentration of n-type impurities increases from 0 to the initial concentration of about $2 \times 10^{18}$ impurities/cubic centimeters, while at a distance of $0.1\mu$ from the p-n-junction 4 the effective concentration is about $10^{17}$ impurities/cubic centimetre which is the original donor concentration minus the diffused acceptors.

Thus, in the n-type region 3 for a distance $a = 2\mu$ (which satisfies the condition (1') we find $$\frac{N_2}{m_2^*} - \frac{N_1}{m_1^*} = \frac{2 \times 10^{18}}{m_2^*} - \frac{10^{17}}{m_1^*} \approx 4.8 \times 10^{19}$$

since $m_2^*$ and $m_1^*$ both are about 0.04.

To satisfy the condition (3) the following condition must apply:

$$4.8 \times 10^{19} \geq 1.4 \times 10^{20}/a^2$$

or, since $a = 2\mu$, $$4.8 \times 10^{19} \geq 3.5 \times 10^{19}$$

from which it follows that the condition (3) is satisfied.

According to the condition (4) the following condition must obtain:

$$N_2 < 1.2 \times 10^{21} m_2^*/\lambda_m^2$$

or $$2 \times 10^{18} < 3.5 \times 10^{22} m_2^*$$

The condition (4) is also satisfied since $m_2^*$ is about 0.04.

According to the condition (2) the decrease of the real part of the refractive index must be greater than or equal to:

$$\frac{10\lambda_m^2}{a^2} = \frac{10 \times 0.04}{4} = 0.1\%$$

In practice this actually proves to be the case, which was to be expected if the condition (3) is satisfied.

Thus, the desired result is achieved in the n-type region 3. In the p-type region 2, however, this is not the case.

In the p-type region the effective concentration of the p-type impurities (zinc atoms) increases from 0 to about $1.5 \times 10^{18}$ impurities/cubic centimetre through a distance of $6\mu$ (the maximum permissible distance $a$ according to the condition (1)) while at a distance of $0.1\mu$ from the p-n junction the effective concentration is about $10^{17}$ impurities/cubic centimetre.

According to condition (3) one obtains:

$$\frac{1.5\times10^{18}}{m_2^*}-\frac{10^{17}}{m_1^*}\geq1.4\times10^{20}/a^2$$

and, since in the p-type region 2 $m_2^*$ and $m_1^*$ are about 0.5 times the mass of a free electron in a vacuum and $a=6\mu$, this would mean that $1.4\times10^{18}$ is greater than $2\times10^{18}$, which is not true and shows that the condition (3) is not satisfied.

To satisfy this condition, a p-type alloy consisting of tin including about 10 atom percent of zinc is alloyed onto the p-type region 2. For this purpose, a filament 6 (FIGURES 4 and 5) consisting of this alloy is placed on the centre of the p-type region 2. The filament 6 may have a thickness of about $30\mu$. (The filament may be replaced by a ribbon having a cross-sectional area of about 100 x $10\mu$).

Figure 6:
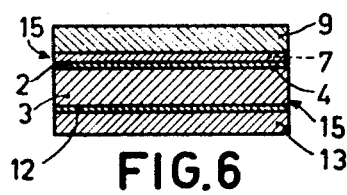
Figure 7:
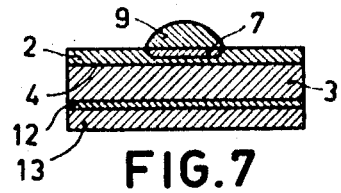

The whole is heated to about 500° C. in a protective atmosphere, for example, a nitrogen atmosphere for a period of 1 to 2 minutes. The alloying front penetrates through a distance of about $5\mu$ into the p-type region 2 which is about $10\mu$ thick. A p-type alloy region 7 (FIGURES 6 and 7) having a thickness of about $5\mu$ is produced in the p-type region 2. The resolidified electrode material is designated by 9.

The whole may simultaneously be secured to a support 13 of, for example, gold-plated tantalum with the aid of a layer of tin 12.

By the provision of the alloy region 7 the concentration of p-type impurities at a distance of about $5\mu$ from the p-n junction 4 is raised to slightly more than $2\times10^{19}$ impurities/cubic centimetre, so that the condition (3) is satisfied.

According to the condition (4) we must have:

$$N_2\approx2\times10^{19}<1.2\times10^{21}m_2^*/\lambda_m^2\approx1.8\times10^{22}$$

Since this inequality is true, the condition (4) is really satisfied.

The distance $a$ is about $5\mu$, so that the condition (1) is satisfied.

It is found that the variation in the real part of the index of refraction is about 0.16% so that the condition (2) is amply satisfied, which is to be expected when the condition (3) is satisfied. For satisfactory operation of the optical maser lateral faces 15 (FIG. 6), which are substantially at right angles to the plane of the p-n junction 4 and to the longitudinal direction of the alloy region 7, must be ground flat and parallel with a high degree of accuracy. These lateral faces 15 serve as the reflecting members (mirror surfaces) of the injection maser, which are partially transparent. If desired, they may be coated with an additional reflecting layer, for example, of gold, which for one of the lateral faces 15 may be opaque. The distance between the lateral faces 15 may be about 0.5 mm.

In the operation of the injection maser described, the radiation losses prove to be particularly slight, while the beam of radiation, which is substantially parallel to the p-n junction 4 and in the proximity of this p-n junction as substantially produced under the alloy region 7, has a width of about 7 to $8\mu$, measured in a direction at right angles to the p-n junction.

Figure 4:
Figure 5:
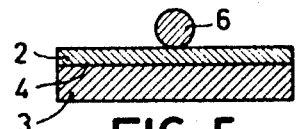

In the embodiment described, on the p-type side of the p-n junction the condition (1) is satisfied, but the preferential condition (1') is not. The latter condition may be satisfied by alloying a filament 6 to a slightly greater depth into the p-type region 2 (FIGURE 4). This requires a highly accurate alloying technique.

Although the desired variations or gradients in the concentrations of impurities may be obtained by diffusion and alloying methods, these variations can be obtained with better reproducibility by means of epitaxial growing from the vapour phase, and the latter method will be used in the following example, in which the condition (1') is satisfied on both sides of the p-n junction.

In this example also, the semi-conductor body consists of gallium arsenide.

Manufacture starts from an n-type wafer of gallium arsenide of 5 x 5 mm. and about $50\mu$ thick having a concentration of about $3\times10^{18}$ tellurium atoms/cubic centimetre.

The wafer 20 (FIGURE 8) is arranged in a vacuum bell jar which is shown schematically by a broken line 28, on a holder 22 made, for example, of tantalum so that a large surface 29 of the wafer which preferably is a $(\bar{1},\bar{1},\bar{1})$ crystal plane faces crucibles 25 filled with a material 21 to be deposited from the vapour phase.

The wafer 20 may be heated with the aid of a heating helix 23 and a reflector 24.

The crucibles 25, which are made, for example, of quartz, are spaced from the wafer 20 by a distance of about 5 cm. and each have a diameter of about 0.5 cm.

Figure 9:
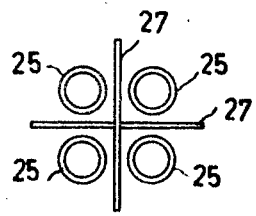
FIGURE 9 is a plan view of the arrangement of the crucibles used in the apparatus of FIGURE 8.

There are four crucibles 25 which are arranged in the manner shown by the plan view of FIGURE 9. The crucibles 25 are disposed in holders 26 made, for example, of tantalum which may be heated by built-in heating helices (not shown).

The crucibles 25 and the holders 26 are separated from one another by heat screens 27 consisting, for example, of a heat-insulating layer, of, for example, $Al_2O_3$ sandwiched between two sheets of tantalum.

In operation the vacuum bell jar 28 is evacuated to a high vacuum or, for example, $10^{-6}$ millimetre of mercury pressure, and the wafer 20 is heated to about 100° C. The four crucibles 25 contain gallium, arsenic, tellurium and zinc, respectively.

Figure 10:
FIGURES 10 and 11 are schematic cross-sectional views of various semi-conductor bodies for use in further embodiments of injection masers according to the invention.

First the gallium is heated to about 1000° C., the arsenic to about 600° C. and the tellurium to about 450° C. After about one hour, it is found that a layer 30 (FIGURE 10) of n-type gallium arsenide containing about $3\times10^{18}$ tellurium atoms per cubic centimetre and having a thickness of about $5\mu$ is grown onto the wafer 20.

Subsequently the temperature of the tellurium is reduced to 150° C. or less, during the period of time in which a further layer 31 having a thickness of about $2\mu$ is grown, in which layer the concentration of tellurium atoms decreases to a final concentration of at most $10^{17}$ tellurium atoms per cubic centimetre owing to the cooling of the tellurium.

During the growth of the layer 31 the zinc is heated to about 350° C. and is further heated to about 600° C. during the growth of a further layer 32, which has a thickness of about $2\mu$, so that the concentration of zinc in the p-type layer 32 increases to about $2\times10^{19}$ zinc atoms/cubic centimetre.

Growing is continued for about another hour while the zinc is heated to a temperature of about 650° C., a p-type layer 33 being produced having a thickness of about $5\mu$ and a concentration of zinc atoms of about $4\times10^{19}$ zinc atoms/cubic centimetre, The p-n junction is located about at the transition from the layer 31 to the layer 32.

Thus, on the n-type side of the p-n junction the layer 31 is produced, in which the effective concentration of n-type impurities (tellurium atoms) increases from about $10^{17}$ to about $3\times10^{18}$ impurities/cubic centimetre between the distances $0.1\mu$ and $2\mu$ from the p-n junction. For the n-type side of the p-n junction this corresponds substantially to the preceding example, in which the conditions (1') to (4) are satisfied.

On the p-type side of the p-n junction the effective concentration of the p-type impurities (zinc atoms), starting from the distance of $0.1\mu$ from the p-n junction, increases through the layer 32 from about $10^{17}$ to about $3\times10^{19}$ zinc atoms/cubic centimetre.

According to the condition (3) we must have approximately $$3\times10^{19}\geq1.4\times10^{20}m^*/a^2$$

while on the p-type side the number 0.5 may be put for $m^*$ while the distance $a$ is about $2\mu$, so that we should have:

$$3 \times 10^{19} \geq 1.7 \times 10^{19}$$

and, since this inequality is really true, the condition (3) is satisfied.

Since the maximum concentration of the p-type impurities ($3 \times 10^{19}$ impurities per cubic centimetre) is about the same as in the preceding example, the condition (4) is also satisfied.

In this case, the condition (1') is satisfied on both sides of the p-n junction.

The resulting plate 20 provided with the epitaxial layers 30 to 33 may be subdivided in a direction at right angles to the p-n junction into wafers of a size which approximately corresponds to that of the wafer of the preceding example.

Similarly to the wafer of the preceding example, the said wafers must be provided with two opposed reflecting surfaces at right angles to the p-n junction.

Similarly to the wafer of the preceding example, each wafer may be secured by means of a layer of tin to a support of gold-plated tantalum which may also serve as a contact member.

A contact member consisting of a tin-zinc alloy (including, for example, 10 atoms percent of zinc) may be alloyed onto the layer 33 at a temperature of about 500° C., which is maintained for about 1 minute.

It is found that, compared with the preceding example, the radiation losses are slightly reduced, while the width of the beam of radiation produced in operation is about $4\mu$, viewed in a direction at right angles to the p-n junction.

An embodiment of an injection maser according to the invention will now be described, in which the decrease of the real part of the refractive index is produced by a change in the composition of the semi-conductor material itself.

Manufacture starts from a gallium arsenide wafer of the same kind as that used in the preceding example. For the epitaxial growing from the vapour phase the same arrangement is used as has been described with reference to FIGURE 8, with the difference that an additional crucible 25 is provided which contains phosphorus.

Figure 11:
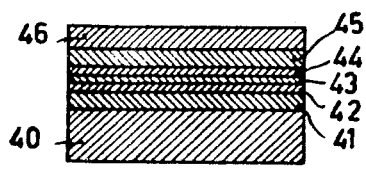

Similarly to the preceding example, there is first grown onto a wafer 40 (FIGURE 11) an n-type layer 41 about $5\mu$ thick in a period of about one hour. (The temperatures are the same as those used in growing the layer 30 of FIGURE 10, where the phosphorus was not heated.)

The phosphorus is then rapidly heated to 300° C. (the other temperatures remaining the same) and an about $2\mu$ thick n-type layer 42 containing phosphorus is grown, after which the heating of the phosphorus is stopped and an about $1\mu$ thick n-type layer 43 is grown which contains substantially no phosphorus.

The heating of the crucible containing tellurium is then switched off, while the crucible containing zinc is rapidly heated to 650° C. This crucible may be screened with the aid of a movable screen made, for example, of tantalum (not shown in FIGURE 8) while the crucible containing zinc may previously have been brought to 650° C. while being covered by a movable screen, which now is suddenly removed. The conductivity type of the material being grown onto the wafer thus is suddenly changed from n-type to p-type, a $1\mu$ thick p-type layer 44 being grown.

Figure 8:
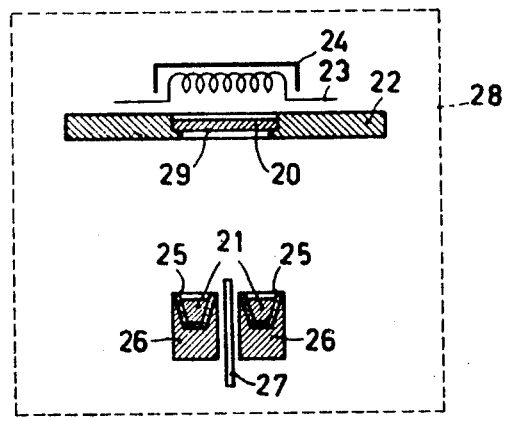

Subsequently the phosphorus is again heated to 300° C. and the p-type layer 45 containing phosphorus and having a thickness of about $2\mu$ is grown, after which, after cooling of the phosphorus, a $5\mu$ thick p-type layer 46 containing no phosphorus is grown. The resulting assembly is then removed from the vacuum bell jar 8 (FIGURE 8).

It is found that the n-type layer 42 and the p-type layer 45 contain two molecule percent of gallium phosphide, while the n-type layer 43 and the p-type layer 44 contain substantially no gallium phosphide, with the result that the difference in the real part of the refractive index between the layers 43 and 42 and that between the layers 44 and 45 are each about 1%.

Since the layers 43 and 44 are each about $1\mu$ thick, the distance $a$ on both sides of the p-n junction is about $1\mu$ and hence the condition (1') is satisfied. The required decrease of the real part of the refractive index is $$\frac{10\lambda_m^2}{a^2} = \frac{10 \times 0.04}{1} \approx 0.4\%$$

which is amply satisfied.

Similarly to the plate of the preceding example, the plate obtained may be subdivided into wafers, which may be provided with reflecting surfaces and contact members in the manner described with reference to the preceding example.

In the injection masers manufactured by this method the radiation losses prove to be particularly small while the radiation beam produced in operation in the proximity of the p-n junction has a width of about $2\mu$, viewed in a direction substantially at right angles to the p-n junction.

It will be appreciated that the invention is not restricted to the embodiment described and that a person skilled in the art may make many modifications without departing from the scope of the invention. For example, semi-conductor materials other than the materials mentioned may be used. The semi-conductor body may consist of indium antimonide at the location of the p-n junction, the indium antimonide passing, in a direction away from the p-n junction, into a mixed crystal of indium antimonide and indium arsenide, so that a decrease of the real part of the refractive index is induced. Alternatively, other usual impurities may be employed. Furthermore the junction may include a substantially intrinsic layer. This has the advantage that, when free charge carriers are injected and recombination radiation is produced, substantially no inconvenient activity of impurities can occur. The decrease in the real part of the refractive index may alternatively be caused by simultaneously occurring changes both in the composition of the semi-conductor material itself and in the concentration of the impurities determining the conductivity type.

What is claimed is:

1. An injection maser comprising a semiconductive body including p and n type zones separated by a p-n junction layer, at least one of these zones containing such a high concentration of active impurities determining the conductivity type thereof that upon the injection of charge carriers stimulated emission of recombination radiation results producing a beam of radiation travelling substantially parallel to the plane of the p-n junction layer, said body containing on opposite sides of the junction regions each of which is spaced from the junction center in a direction substantially perpendicular to the plane thereof a distance in microns between a minimum value of $\lambda_m/2$ and a maximum value of $30\lambda_m$, where $\lambda_m$ is the wavelength in microns of the recombination radiation in the semiconductive body, the real part of the refractive index of the semiconductive body material throughout each of the said regions decreasing by at least $10\lambda_m/a^2$ percent of the material's refractive index at the junction, where $a$ is the distance to the junction center of any point in each of the said regions measured in a direction away from the junction layer, whereby diffraction losses of the maser are reduced.

2. An injection maser as claimed in claim 1 in which at least one side of the junction layer in a direction away from the junction layer the concentration of the impurities determining the conductivity type is increased to a sufficient level to produce the said decrease in the real part of the refractive index.

3. An injection maser as claimed in claim 2 in which the increase in the concentration of the impurities which determines the conductivity type has a value at which the associated increase in the concentration of free charge carriers satisfies the following condition:

$$\frac{N_2}{m_2^*} - \frac{N_1}{m_1^*} \geq \frac{1.4 \times 10^{20}}{a^2}$$

where $N_1$ and $m_1^*$ are the concentration of free charge carriers per cubic centimeter and the effective mass of the free charge carriers (expressed in units equal to the mass of a free electron in vacuum), respectively, at a distance equal to $\frac{1}{2}\lambda_m$ from the junction center, and $N_2$ and $m_2^*$ represent the corresponding quantities at the distance $a$ from the junction center.

4. An injection maser as claimed in claim 3 in which approximately at the distance $a$ from the junction center, the concentration $N_2$ of free charge carriers is less than $1.2 \times 10^{21} m_2^*/\lambda_m^2$.

5. An injection maser as claimed in claim 2 in which the said impurity concentration increase exists on both sides of the junction in a direction away from the junction layer.

6. An injection maser as claimed in claim 1 in which the junction layer includes a substantially intrinsic layer.

7. An injection maser as claimed in claim 6 in which the substantially intrinsic layer has a thickness which is at most equal to $10\lambda_m$.

8. An injection laser comprising a semiconductive body including p and n type zones separated by a p-n junction layer, at least one of these zones containing a high concentration of active impurities determining the conductivity type thereof, means for injecting charge carriers in said zone such that stimulated emission of recombination radiation results producing a beam of radiation travelling substantially parallel to the plane of the p-n junction layer, reflection means disposed at opposite sides of the plane of the p-n junction to cause the beam to traverse continuously the zone of the p-n junction, said body containing on opposite sides of the junction regions each of which is spaced from the junction center in a direction substantially perpendicular to the plane thereof a distance in microns between a minimum value of $\frac{1}{2}\lambda_m$, and a maximum value of $15\lambda_m$, where $\lambda_m$ is the wavelength in microns of the recombination radiation in the semiconductive body, the real part of the refractive index of the semiconductive body material throughout each of the said regions decreasing by at least $10\lambda_m/a^2$ percent of the material's refractive index at the junction, where $a$ is the distance to the junction center measured in a direction away from the junction layer, whereby diffraction losses of the laser are reduced.

9. An injection laser as claimed in claim 8 in which, apart from the impurities which determine the conductivity type, in the said semiconductor body on at least one side of the junction layer, a sufficient change in the composition of the semiconductor material itself exists producing the said decrease of the real part of the refractive index.

10. An injection laser as claimed in claim 9 in which the said compositional change exists on both sides of the junction layer.

11. An injection laser as claimed in claim 9 in which the semiconductive body at the region of the junction layer consists essentially of gallium arsenide, and the part with the compositional change includes phosphorus forming a substance selected from the group consisting of gallium phosphide and a mixed crystal of gallium phosphide and gallium arsenide.

12. An injection laser as claimed in claim 9 in which the semiconductive body at the region of the junction layer consists essentially of indium antimonide, and the part with the compositional change includes arsenic forming a substance selected from the group consisting of indium arsenide and a mixed crystal of indium arsenide and indium antimonide.

References Cited
UNITED STATES PATENTS 3,295,911    1/1967    Ashkin et al. _____ 331—94.5

DAVID SCHONBERG, Primary Examiner

PAUL R. MILLER, Assistant Examiner

U.S. Cl. X.R.

350—150, 160

UNITED STATES PATENT OFFICE
CERTIFICATE OF CORRECTION

Patent No. 3456209          Dated July 15, 1969

Inventor(s) GESINUS DIEMER

It is certified that error appears in the above-identified patent and that said Letters Patent are hereby corrected as shown below:

Column 3, line 31, after "tion" insert --radiation--

Column 4, line 10, "N/n*" should be --N/m*--

Column 7, line 62, "as" should be --is--

Signed and sealed this 14th day of July, 1970.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No.   3,456,209           Dated   July 15, 1969

Inventor(s)   GESINUS DIEMER

It is certified that error appears in the above-identified patent and that said Letters Patent are hereby corrected as shown below:

Column 3, line 25, "$\lambda m^2$" should read -- $\lambda_m^2$ -- . Column 4, line 17, "mass" should read -- charge -- . Column 6, line 15, "or" should read -- of -- . Column 6, line 64, "$\lambda m^2$" should read -- $\lambda_m^2$ -- . Column 10, line 61, "10 $\lambda m/a^2$" should read -- $10\lambda_m^2/a^2$ -- . Column 12, line 3, "$10\lambda_m^2/a^2$" should read -- $10\ \lambda_m^2/a^2$ -- .

Signed and sealed this 6th day of August 1974.

(SEAL)
Attest:

McCOY M. GIBSON, JR.
Attesting Officer

C. MARSHALL DANN
Commissioner of Patents